May 22, 1934.  A. F. NASH  1,959,987
AEROPLANE AND OTHER AIRCRAFT
Filed Oct. 28, 1933   6 Sheets-Sheet 1
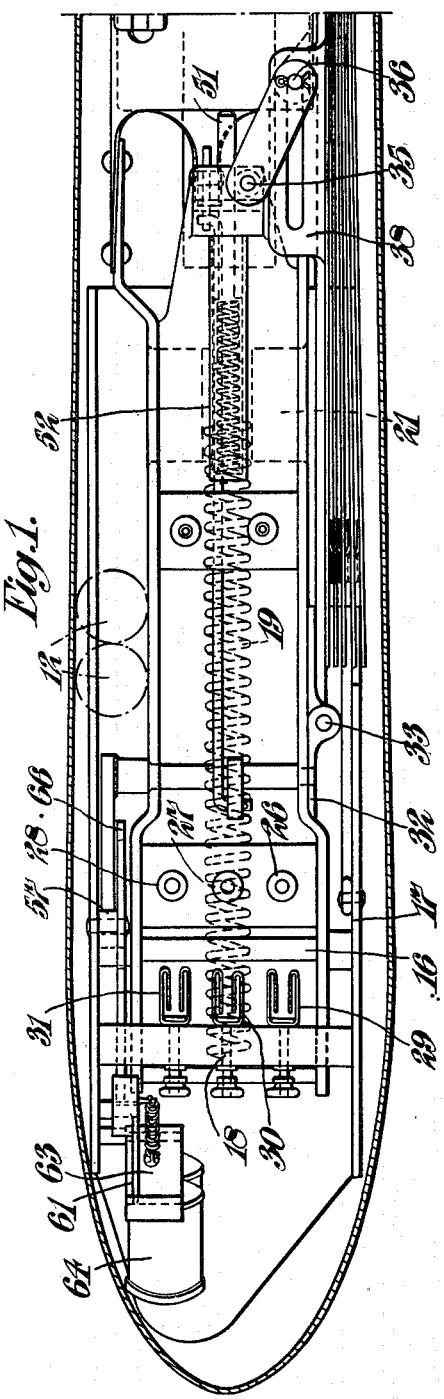
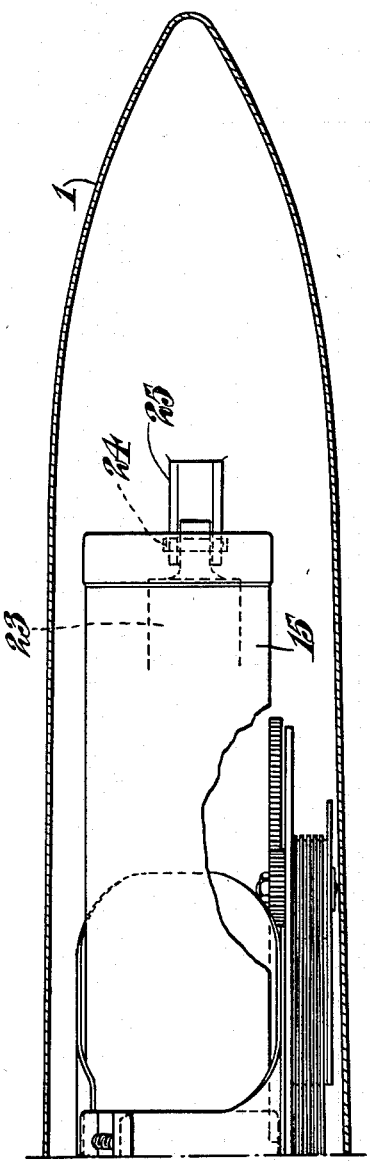
INVENTOR
A. F. Nash,
By Watson, Coit, Morse & Grindle
ATTYS.

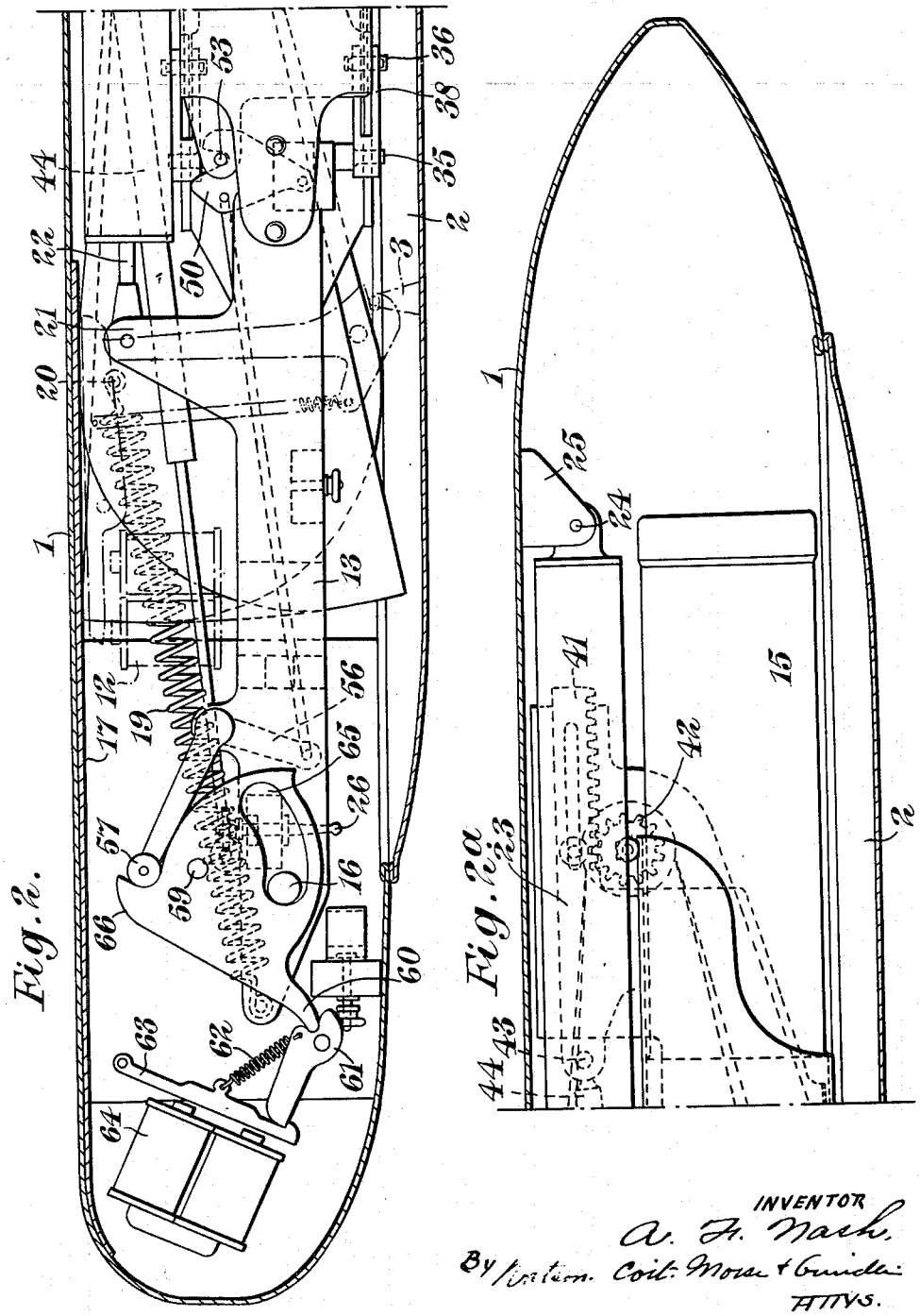

May 22, 1934.  A. F. NASH  1,959,987
AEROPLANE AND OTHER AIRCRAFT
Filed Oct. 28, 1933  6 Sheets-Sheet 3
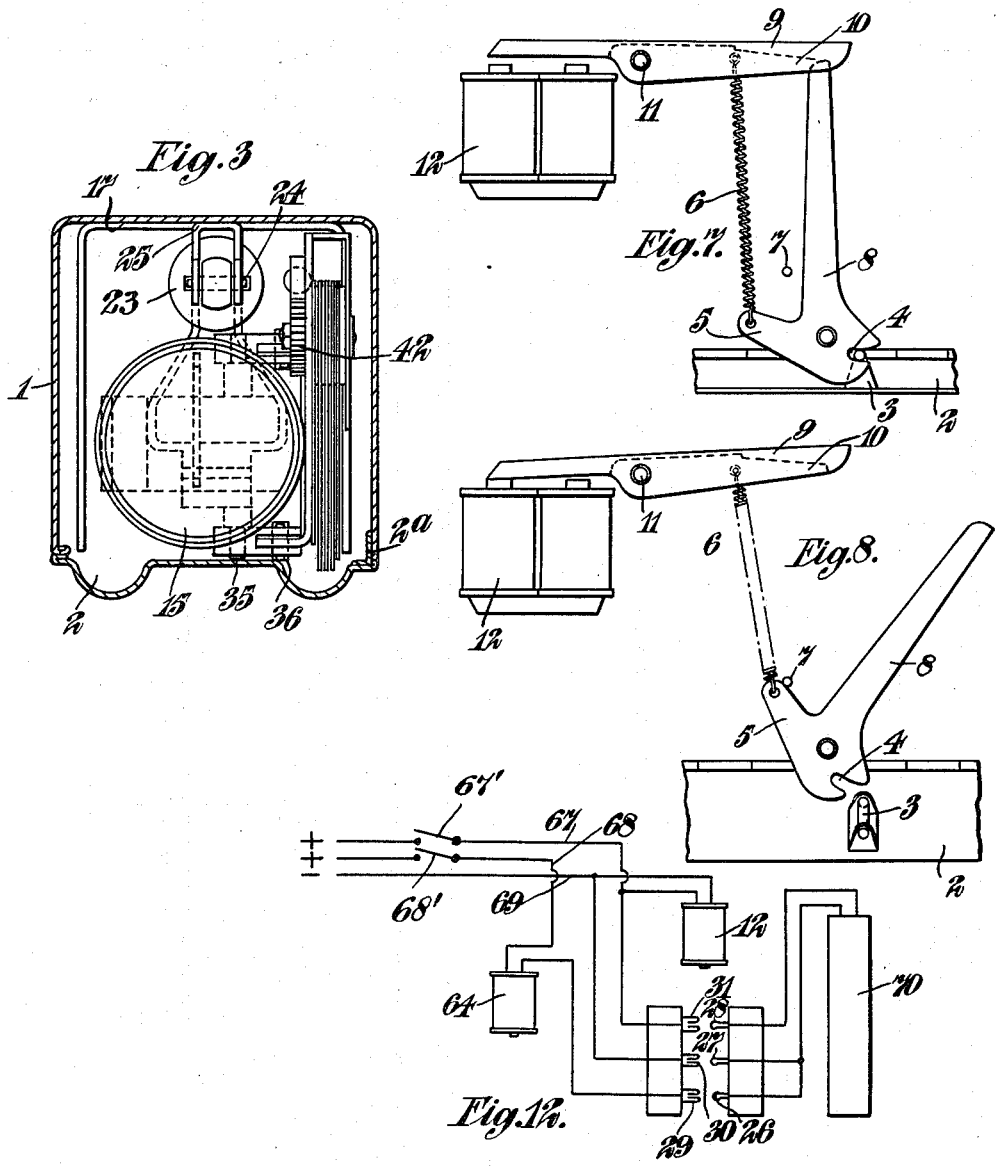

May 22, 1934.  A. F. NASH  1,959,987
AEROPLANE AND OTHER AIRCRAFT
Filed Oct. 28, 1933  6 Sheets-Sheet 4
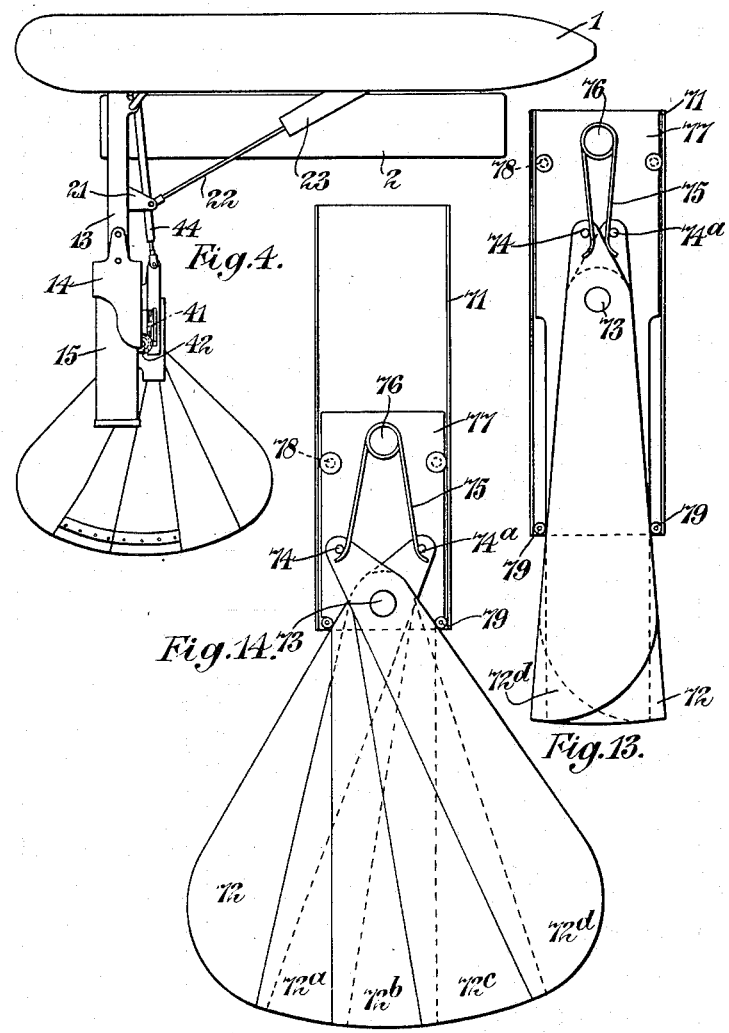
INVENTOR
A. F. Nash May 22, 1934.  A. F. NASH  1,959,987
AEROPLANE AND OTHER AIRCRAFT
Filed Oct. 28, 1933.  6 Sheets-Sheet 5
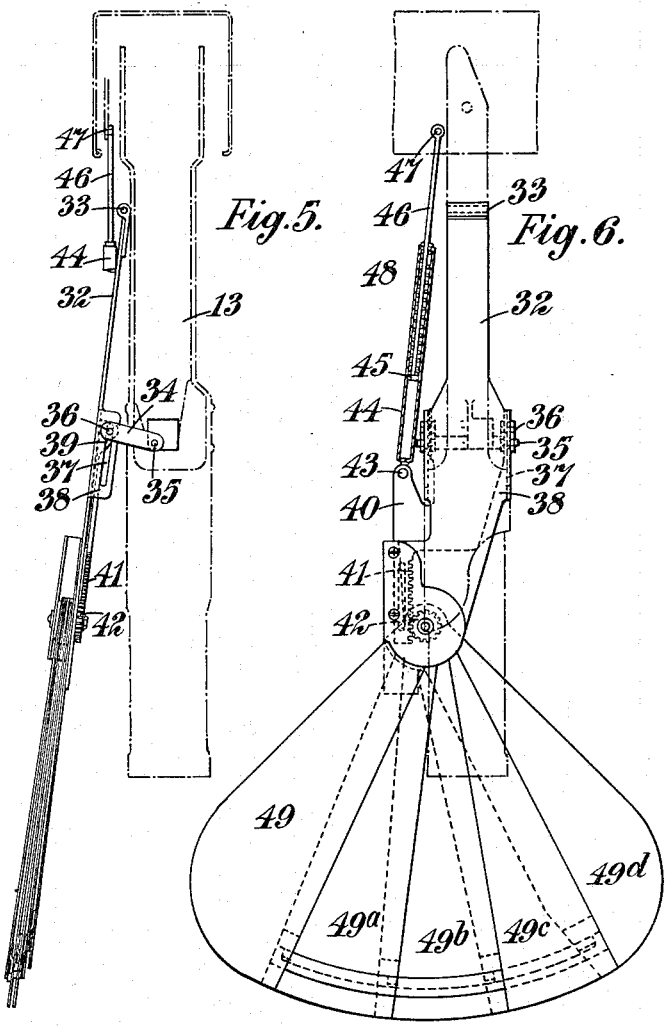
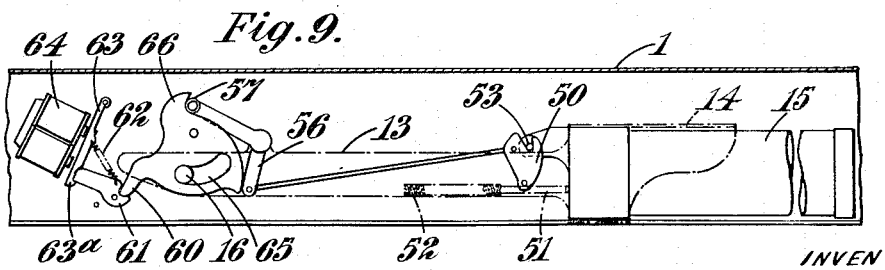

May 22, 1934.    A. F. NASH    1,959,987
AEROPLANE AND OTHER AIRCRAFT
Filed Oct. 28, 1933    6 Sheets-Sheet 6
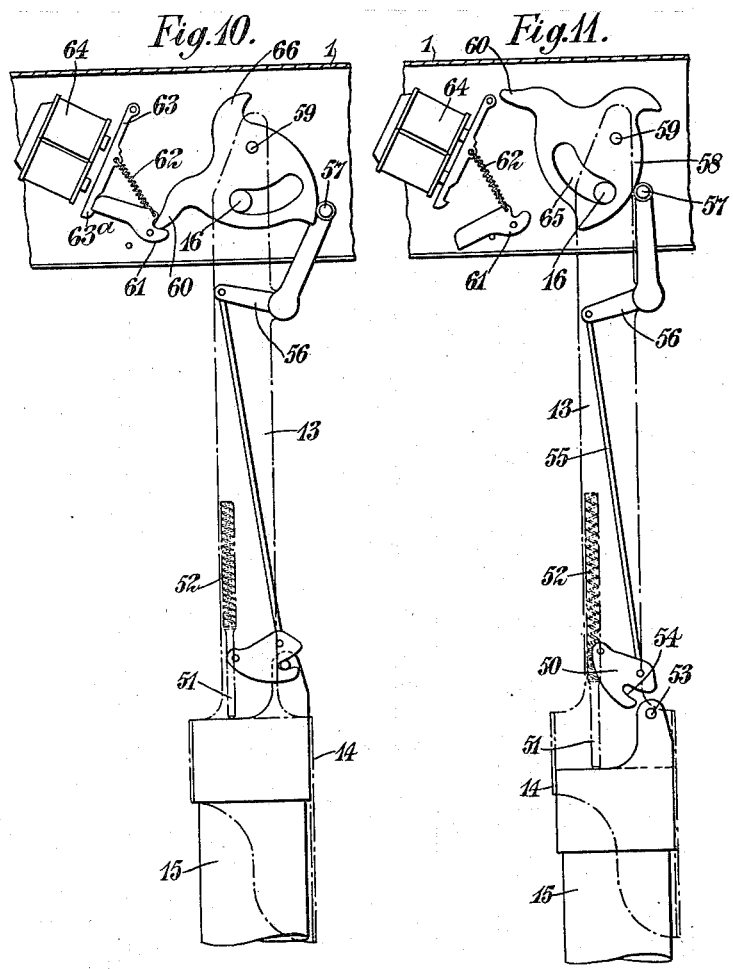

Patented May 22, 1934

1,959,987

UNITED STATES PATENT OFFICE 1,959,987

AEROPLANE AND OTHER AIRCRAFT

Archibald Frazer Nash, Kingston-on-the-Thames, England

Application October 28, 1933, Serial No. 695,671
In Great Britain December 18, 1931

11 Claims.  (Cl. 244—1)

This invention relates to aeroplanes and other aircraft and, in particular, to devices for use in connection therewith of the kind in which there is provided a member functioning as a support, for instance, for a flare, adapted to be extended at the instance of a pilot or other member of the crew beyond the general surface of some portion of the aircraft.

It will, of course, be appreciated that, generally speaking, it is desirable that flares, landing lights, and stannic cloud bombs should be retained within the fuselage or in a streamlined housing associated therewith and that provision should be made to ensure that they are not ignited or rendered active until they have been extended beyond the general surface of the aircraft or such housings.

The object of the present invention is to provide improvements in devices of the kind above referred to for use in connection with flares, landing lights, stannic cloud bombs and the like in which ignition or discharge thereof is effected by means of an electric current and in which inadvertent ignition or discharge while such devices are within the fuselage or housing is prevented.

In the preferred form of the invention the member functioning as a support is associated with means by which on the member being extended connection is made with leads associated with a source of electrical energy to enable, for instance, a flare, supported by the member, to be ignited.

A still further feature of the invention consists in the provision in association with the member functioning as a support for a flare, landing light or the like of an anti-glare device consisting of a shield normally retained with the support in the housing adapted as the result of releasing the support from the position which it normally occupies within the housing, to be moved from an initial or inoperative position to a position in which it will operate to shield the glare of the flare or other object in such direction as may be desired.

Preferably, in accordance with the invention, as applied for use with captive flares, landing lights and the like, that is to say, such as are designed normally to remain secured to the member functioning as a support therefor, the device comprises means for jettisoning the flare, landing light or the like when the support therefor is in its extended position, adapted to be actuated by an electromagnet or the like which is associated with contacts whereby the energizing of the electromagnet is permitted only when the support therefor is extended from the housing.

Further objects and features of the invention will be apparent from the following description taken in connection with the accompanying drawings, in which—

Figures 1 and 1ª form a sectional plan view of a flare device in accordance with the invention, as seen from below.

Figures 2 and 2ª form a sectional elevation thereof,

Figure 3 being a section at right angles to the plane of section of Figure 2;

Figure 4 is a view in elevation showing the various parts in the position which they will assume when it is desired to ignite the flare, Figures 5 and 6 being views on a larger scale illustrating certain of the parts in the position shown in the preceding figure, Figures 7 and 8 being detailed views of the means for releasing the hinged door of the casing in which the flare will normally be housed, while Figures 9, 10 and 11 are views illustrating the arrangement and operation of certain elements of the device;

Figure 12 is a wiring diagram illustrating the means for actuating the device;

Figures 13 and 14 illustrating an alternative construction of anti-glare device.

In Figures 1 to 6 and 9 to 11, 1 is the casing which is streamlined and houses the flare and the mechanism with which it is associated and by which the flare is moved out into the position for ignition, 2 being a door arranged in the lower side of the casing and hinged thereto by the hinge 2a, the door having a torsion spring hinge pin of known character adapted to cause the door to fly open when released. On the door is provided the bar 3 adapted to be engaged in a slot 4, see Figures 7 and 8, in one end of the lever 5, the opposite end of which is associated with a spring 6 adapted to constrain the lever to move into the position shown in Figure 8 and up to the stop 7 when the end of the arm 8 on the lever is released by the movement of the member 9, which is provided with a recess 10, the forward edge of which is formed with a shoulder or stop adapted to engage against the extremity of the arm 8 and on movement of the member 9 about its pivot 11 by the attraction of the electromagnet 12 to release the extremity of the arm whereupon the door opens and the arm 13 carrying the socket 14 in the lower end of which the flare 15 is located will move downward into the position illustrated in Figure 4.

This arm 13 is pivoted on the pin 16 secured to the sides of the channel formed frame 17 and the cross bar 18 on the arm engages one end of the spring 19, the opposite end of which is connected with an anchorage 20 secured to the frame, this spring being arranged to cause, when the door is open, the arm 13 to move out into the position shown in Figures 10 and 11. On the arm 13 is provided the lug 21 connected by the rod 22 with the piston element of the dashpot 23 pivotally secured by the pin 24 to the anchorage 25 within the casing.

Motion of the arm into the extended position under the action of the spring will cause the pin contacts 26, 27 and 28 (Figure 1) on the arm to engage respectively contacts 29, 30 and 31 (Figure 1) on the bar 18.

The arm in its movement into this position carries with it the arm 32 (Figures 5 and 6) with which it is connected by the hinge 33 and link 34. This link is pivotally connected with the arm by the pin 35, and the opposite end of the link is provided with the pin 36 engaging in the slot 37 of the lug 38 formed in the arm 32, the pin passing through and slidably engaging the lugs 39 on the member 40, a portion of which is formed as the rack 41 engaging the pinion 42, the opposite end of the member 40 being connected by the pin 43 with the sleeve 44. Between one end of the sleeve and the enlarged end 45 of the rod 46, which is pivoted to the casing by the pin 47, is arranged the spring 48 which, in the outward movement of the arm causes the rack 41 to rotate the pinion thereby causing the blades 49, 49a, 49b, 49c, and 49d, constituting an anti-glare device or shield to prevent light from the flare by reflection from the propeller or otherwise interfering with the airman's vision, to move relatively to one another into the position shown in Figures 4 and 6, the several blades being provided with inter-engaging lugs adapted to ensure their appropriate positioning.

The flare is adapted to be engaged in the socket 14 by inserting it therein when the catch 50 (see Figures 10 and 11) is in the position illustrated in Figure 11. It is pushed into the socket against the rod 51 thus moving the rod in opposition to the spring 52, the pin 53 which is normally provided in the flare entering the gap 54 in the catch 50 and pressure being applied to the flare while at the same time the arm 13 is moved about its pivot 16 will cause the catch through the intermediary of the rod 55, to move the bell-crank lever 56 about its pivotal connection with the arm 13 thus causing the roller 57 thereon to roll over the edge of the cam 58 which is pivoted by the pin 59 on the upper end of the arm until it reaches the position shown in Figure 9, in which, as will be seen, a projection 60 on the cam will be caused to engage in a recess in the catch 61 with which is associated a spring 62 connecting it with the element 63 forming an extension of the armature of an electromagnet 64. One end of the extension in question is provided with a shoulder 63a adapted to engage one end of the catch 61 in the manner shown in Figures 9 and 10.

When the flare is moved outward from the casing this catch will remain in the position shown in Figure 10 but should occasion arise, the electromagnet 64 can be energized and if energized will cause the armature to permit motion of the catch into the position in which it releases the projection 60 and the pressure exerted by the spring 52 will then tend to move the rod 51 forward to release the flare, the force exerted by the spring operating to move the catch 50 into the position shown in Figure 11, motion into this position being permitted in consequence of the fact that the roller 57 on the bell-crank lever 56 will move the cam 58 into the position shown in Figure 11 until the pin 16 comes in contact with the right-hand end of the slot 65 in the cam 66.

The form and arrangement of this slot is such that while release of the flare while the arm is extended is permitted on energizing the magnet 64, such release cannot take place while the flare is within the casing in the position indicated in Figure 9 for the reason that, when in this position, any movement of the catch 50 tending to release the flare would press the roller 57 against the projection 66 on the cam 58, thus tending to rotate it about its pivot, but such rotation would be prevented by reason of the fact that, with the parts in the position shown, the pin 16 would be bearing against the other end of the slot 65.

The electrical connections of the device can be more clearly seen from the wiring diagram, Figure 12, in which 67 indicates the positive lead from a release and ignition switch 67', 68 a positive lead from a switch 68' intended to be actuated to jettison the flare, if desired, and 69 the common negative lead.

As will be seen, the leads 67 and 69 are connected with the electromagnet 12 so that on actuation of the release and ignition switch, the lid of the housing for the container may be released and the arm carrying the flare extended from the housing. When the arm is extended the contacts 27, 28 will be engaged with the contacts 30, 31 and the flare, which is indicated in this figure by the reference 70, may be ignited, the release and ignition switch being closed.

On the other hand, if the jettisoning switch, which is in the lead 68, is closed the electromagnet 64 will only be energized and the flare jettisoned if the arm 13 is extended and the contacts 26, 27 engaged with the contacts 30 and 31. This arrangement of the contacts prevents, in the first place, the firing of the flare until the arm is extended and, furthermore, prevents the release of the flare from the arm unless the arm is extended.

In Figures 13 and 14, 71 is an arm equivalent to the arm 13 in the previously described construction; 72, 72a, 72b, 72c, 72d are blades pivoted on the pin 73 of the anti-glare device. These blades are provided with inter-engaging lugs in their lower ends, as in the previous constructions, and the two outermost blades are provided with pins 74, 74a engaging with the hairpin spring 75 which is mounted on the pin 76 secured to the slide 77 on which are provided rollers 78 adapted to permit the descent under the action of gravity of the slide until the recesses in the end thereof bear upon the stop 79, the descent of the slide permitting the blades to move outwards into the position shown in Figure 14 under the action of the spring 75.

In conclusion it is to be pointed out that in the above detailed description the form, arrangement and operation of several elements are those which have been found to provide the desired degree of safety or, in other words, adequately to minimize the risk of accident in their use and operation.

I claim:

1. In apparatus for use with aircraft, the combination with a support, of an energizable signaling device carried by said support for movement from an inoperative retracted position on the support to an operative extended position on the support, means for carrying said device on the support in either of the two positions, means associated with said support and initially retaining said device in the retracted position, means for actuating said last named means to release said device for movement to the extended position, and mechanism operable in the extended position only of said device while the latter is on the support for energizing the device.

2. In apparatus for use with aircraft, the combination with a support, of an energizable signaling device carried by said support for movement from an inoperative retracted position on the support to an operative extended position on the support, means associated with said support and initially retaining said device in the retracted position, means for actuating said first named means to release said device for movement to the extended position, and mechanism operable in the extended position only of said device for energizing the latter, said mechanism comprising electrically controlled means associated with said device, a source of electrical energy, a circuit including said electrically controlled means and said source, and a switch in series in said circuit operable to a closed position by movement of said device out of the retracted position thereof only.

3. In apparatus for use with aircraft, the combination with a support, of an energizable signaling device carried by said support for movement from an inoperative retracted position on the support to an operative extended position on the support, means associated with said support and initially retaining said device in the retracted position, means for actuating said first named means to release said device for movement to the extended position, and mechanism operable in the extended position only of said device for releasing the latter from said support, said mechanism comprising electrically controlled means associated with said device, a source of electrical energy, a circuit including said electrically controlled means and said source, and a switch in series in said circuit operable by movement of said device out of the retracted position thereof only.

4. In apparatus for use with aircraft, the combination with a support, of an energizable signaling device carried by said support for movement from an inoperative retracted position on the support to an operative extended position on the support, means for carrying said device on the support in either of the two positions, means associated with said support and initially retaining said device in the retracted position, means for actuating said last named means to release said device for movement to the extended position, mechanism operable in the extended position only of said device while the latter is on the support for energizing the device, and mechanism operable in the extended position of said device only for releasing the latter from the support.

5. In apparatus for use with aircraft, the combination with a support, of an energizable signaling device carried by said support for movement from an inoperative retracted position on the support to an operative extended position on the support, means associated with said support and initially retaining said device in the retracted position, means for actuating said first named means to release said device for movement to the extended position, and mechanism operable in the extended position only of said device for energizing the latter, said mechanism comprising electrically controlled means associated with said device, a source of electrical energy, a circuit including said electrically controlled means and said source, a switch in series in said circuit operable to a closed position by movement of said device out of the retracted position thereof only, and a second switch in series in said circuit operable to complete the closing of the circuit when said first switch is closed.

6. In apparatus for use with aircraft, the combination with a support, of an energizable signaling device carried by said support for movement from an inoperative retracted position on the support to an operative extended position on the support, means associated with said support and initially retaining said device in the retracted position, means for actuating said first named means to release said device for movement to the extended position, and mechanism operable in the extended position only of said device for releasing the latter from said support, said mechanism comprising electrically controlled means associated with said device, a source of electrical energy, a circuit including said electrically controlled means and said source, a switch in series in said circuit operable by movement of said device out of the retracted position thereof only, and a second switch in series in said circuit operable to complete the closing of the circuit when said first switch is closed.

7. In apparatus for use with aircraft, the combination with a support, of an energizable signalling device carried by said support for movement from an inoperative retracted position on the support to an operative extended position on the support, means associated with said support and initially retaining said device in the retracted position, means for actuating said first named means to release said device for movement to the extended position, mechanism operable in the extended position only of said device for energizing the latter, and motion retarding means acting between said support and said device to control the rate of movement of the latter from the retracted to the extended position.

8. In apparatus for use with aircraft, the combination with a support, of an energizable signalling device carried by said support for movement from an inoperative retracted position on the support to an operative extended position on the support, means associated with said support and initially retaining said device in the retracted position, means for actuating said first named means to release said device for movement to the extended position, mechanism operable in the extended position only of said device for energizing the latter, and motion retarding means acting between said support and said device to control the rate of movement of the latter from the retracted to the extended position, said motion retarding means comprising a dashpot.

9. In apparatus for use with aircraft, the combination with a housing having an opening thereon, of a door for closing said opening, an energizable signalling device pivoted within said housing for movement from a retracted position therein to an extended position through said opening, releasable means normally retaining said door in closed position with the device in said housing, mechanism for actuating said last named means to release said device for movement through the door to the extended position, and mechanism operable in the extended position of said device only for energizing the latter.

10. In apparatus for use with aircraft, the combination with a support, of a member pivoted on said support for movement from an inoperative retracted position to an operative extended position, a flare carried by said member, and electrical means for igniting said flare, said means comprising an electrical circuit including a two element switch, one of the elements of said switch being carried by said member, the other element of the switch being carried by said support and positioned for engagement by said first element in the extended position only of said member.

11. In apparatus for use with aircraft, the combination with a support, of a member pivoted on said support for movement from an inoperative retracted position to an operative extended position, a flare carried by said member, and electrical means for igniting said flare, said means comprising an electrical circuit including a two element switch, one of the elements of said switch being carried by said member, the other element of the switch being carried by said support and positioned for engagement by said first element in the extended position only of said member, and electrical means for releasing said flare from said member, said last named electrical means comprising an electrical circuit including a two element switch, one of the elements of said switch being carried by said member, the other element of the switch being carried by said support and positioned for engagement by said first element in the extended position only of said member.

ARCHIBALD FRAZER NASH.